Figure 1:
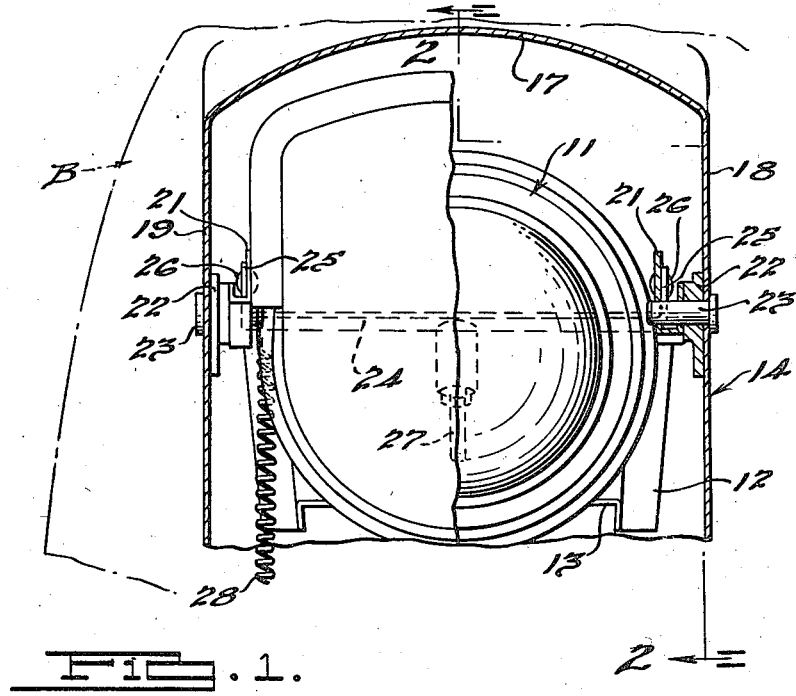

Nov. 13, 1945.  C. H. KUSCHEL ET AL  2,388,788

HEADLAMP CLOSURE OR SHUTTER

Filed Aug. 30, 1941

INVENTORS.
Clarence H. Kuschel,
Herbert C. Brill.
BY Gray and Smith
ATTORNEYS.

Patented Nov. 13, 1945

2,388,788

UNITED STATES PATENT OFFICE 2,388,788

HEAD-LAMP CLOSURE OR SHUTTER

Clarence H. Kuschel and Herbert C. Brill, Detroit, Mich., assignors to Briggs Manufacturing Company, Detroit, Mich., a corporation of Michigan Application August 30, 1941, Serial No. 408,979

4 Claims. (Cl. 240—7.1)

The present invention relates to motor vehicle bodies and more particularly to closure means, covers, or masks for the headlamps of such bodies for the purpose of concealing or masking the same from view at predetermined times.

One of the objects of the present invention is to provide a motor vehicle body in which the frontal surface or portion is provided with an opening behind which is disposed a lamp, and closure or masking means for the opening under the control of the vehicle operator, which means is movable into and out of closed position beneath or behind a body frontal portion, such as a front fender of the vehicle.

Another object of the present invention is to provide an improved device of the foregoing character which is adapted to close an opening formed in a frontal portion of the vehicle body, such as a front fender of said vehicle, to preserve the streamlining or normal contour of said body.

Another object of the present invention is to provide an improved device of the foregoing character having improved closure means or a cover for the opening which when in open position provides a visor or projecting portion located above the headlamp and extending forwardly of the opening.

A further object of the present invention is to provide an improved headlamp cover, mask, or closure member and means for mounting the same which is of relatively simple and inexpensive construction.

The foregoing and other objects and advantages of the present invention will appear from the following description and appended claims when considered in connection with the accompanying drawing forming a part of this specification wherein like reference characters designate corresponding parts in the several views.

Figure 2:
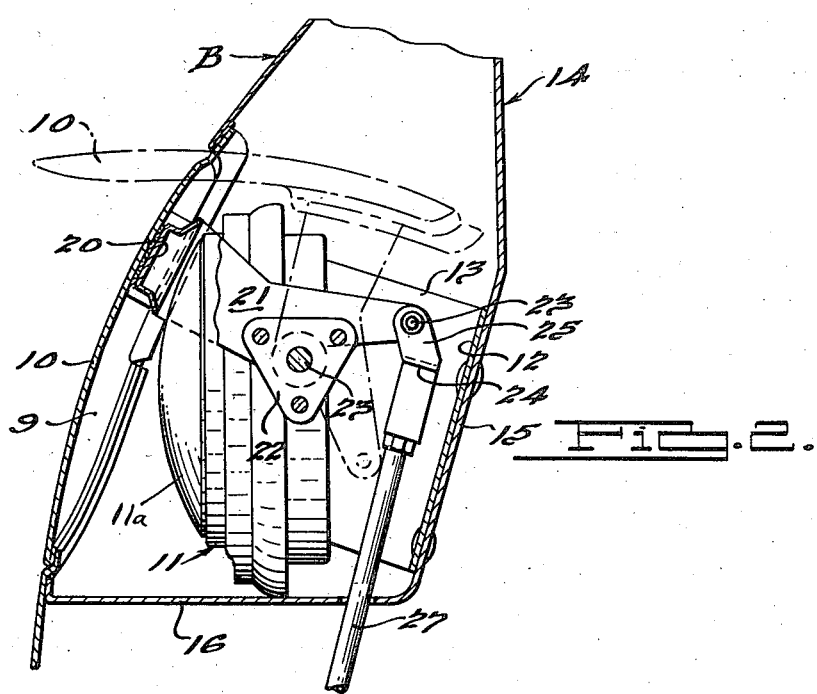

In said drawing:

Fig. 1 is an enlarged vertical sectional view, partly in elevation and partly broken away, illustrating more particularly one of the lamps of a motor vehicle, said lamp being located behind an opening in a frontal surface or portion of the vehicle, such as a front fender thereof; and Fig. 2 is a sectional view, partly in elevation, taken substantially along the line 2—2 of Fig. 1, looking in the direction of the arrows.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation.

The present invention contemplates a novel arrangement by which the closure, cover member or mask for the headlamp is placed in an open position with respect to the opening in the frontal surface of the motor vehicle when it is desired to light the headlamp and which is placed in closed position with respect to said opening when the headlamp is unlighted.

Referring now particularly to the drawing, B represents a fragment of a frontal surface or portion of a motor vehicle, such as a front fender thereof which is provided with an opening 9 in its front face or surface, said opening being adapted to be closed by a movable closure member, lid or mask, shown at 10. Located behind the opening 9 and in line therewith is a headlamp 11 of conventional structure having a lens 11a. The headlamp is intended to project rays of light through the opening when the closure or cover member 10 is in its open position as indicated in broken lines in Fig. 2.

The headlamp 11 is preferably supported in position behind the opening formed in the fender by means of a bracket member or support having a portion 12 and portion 13 extending therefrom. This supporting bracket 12, 13 is preferably attached to the headlamp and also to the rear wall of a housing or casing located beneath the fender B and indicated as a whole at 14. This member or housing 14 comprises a rear wall 15, a bottom wall 16 and an arcuate top wall 17, together with end or side walls 18 and 19. It will be seen that the portion 12 of the bracket is secured, as by means of welding, to the inner face of the rear or back wall 15 of the housing or casing. The closure member or lid 10 is preferably mounted upon and supported by a swinging bracket having a cross member or portion 20 which is substantially U-shaped in cross section and which has rearwardly extending arms or portions 21. These arms provide leg members of the cross member and each is provided with an aperture which is adapted to be aligned with an aperture in an adjacent bearing support 22 for the reception of a pin 23 by which the closure 10 is mounted for swinging movement. The bearing supports 22 are mounted, respectively, upon the inner faces of the end or side walls 18 and 19 of the housing or casing member 14, being attached to the walls by bolts, screws or if desired they may be riveted or welded to said walls. A cross member 24 having offset end portions 25 extends between the side walls and between the side portions 21 of the closure bracket, the offset end portions 25 being secured thereto by the rivets 26, see particularly Fig. 1.

The lid or closure member 10 is adapted to be moved from its closed position as shown in full lines to its open position as shown in broken lines, Fig. 2, through the medium of the bracket member 21 and cross member 24, 25, by means of a push and pull operating rod 27 which is secured to the member 24. It will be understood that this operating rod 27 is connected by links and levers or other suitable mechanical or hydraulic elements to a remote control device within easy reach of the operator of the vehicle.

It will be seen, reference being had particularly to Fig. 2 of the drawing, that when the lid or closure member 10 is in its elevated position, the forward portion thereof projects outwardly or forwardly through the opening formed in the fender B. Thus, the forward portion of the lid or closure provides a visor or shield for the opening formed in the fender in advance of the headlamp 11.

While we have shown one form of mechanical control or operating means for shifting the lid or closure member 10 from its closed to open position, and vice versa, it will be understood that other suitable means may be employed.

As shown in Fig. 1 it may be desirable to provide spring means for moving the lid into open position and thereby only necessitate use of the rod 27 to close the lid. In such case a tension spring 28 may be provided, the lower end of which is attached to the bottom 16 of the casing and at its upper end attached to the cross bar or member 24. The spring 28 is preferably preloaded so as to exert a constant effort to hold the lid yieldingly in open position. By shifting rod 27 endwise in an upward direction the lid may be closed against the resistance of the spring. A suitable catch may be provided on the remote control device to hold the rod in this position so that it is merely necessary to release the catch to permit the spring to swing the lid into open position.

We claim:

1. The combination with a motor vehicle frontal portion having an opening formed therein, of a headlamp disposed behind said opening, a closure member for said opening, and means for swinging said closure member relatively to the headlamp to uncover said opening by shifting the lower end thereof outwardly of the opening and upwards and shifting the upper end thereof rearwardly of the opening or vice versa to close said opening, said closure member in open position projecting through the upper end of the opening in advance of the headlamp to provide a visor.

2. The combination with a motor vehicle frontal portion having an opening formed therein, a headlamp mounted in fixed position in rear of said opening, a single closure member adapted to entirely close said opening, means for pivotally supporting said closure member for movement independently of the headlamp, and means for tilting the closure member to uncover the opening and into position to form a visor for the headlamp by moving the lower end thereof outwardly of the opening and vertically to a point above the level of the headlamp and moving the upper end thereof rearwardly of the opening.

3. The combination with a vehicle frontal portion having an opening formed therein, a headlamp disposed behind said opening, a closure member for said opening movable independently of the headlamp between the latter and said opening into closed and opened positions with respect to said opening, and means for shifting said closure member relatively to the headlamp to uncover said opening by shifting the lower end outwardly and upwards and the upper end inwardly thereby to position the closure member above said headlamp into position to form a visor therefor.

4. The combination with a vehicle frontal portion having an opening formed therein, a headlamp disposed in fixed position behind said opening, a closure member for said opening movable independently of the headlamp between the latter and said opening into closed and opened positions with respect to said opening, and means for shifting said closure member relatively to the headlamp to uncover said opening by shifting the lower end outwardly and upwards and the upper end inwardly thereby to position the closure member above said headlamp with the lower portion of the closure member projecting forwardly beyond the opening to provide a visor.

CLARENCE H. KUSCHEL.
HERBERT C. BRILL.